United States Patent [19]

Martinovic

[11] Patent Number: 5,858,089
[45] Date of Patent: Jan. 12, 1999

[54] CORN BUTTERING TOOL

[76] Inventor: Zoran Martinovic, 120 Wooster St., Apt. #P, New Haven, Conn. 06511

[21] Appl. No.: 917,535

[22] Filed: Aug. 26, 1997

[51] Int. Cl.⁶ ..................................... A23G 3/00
[52] U.S. Cl. ................ 118/13; 118/26; 118/31; 118/428; 118/501
[58] Field of Search .................. 118/13, 26, 31, 118/428, 501; 426/302, 307; 220/571, 572

[56] References Cited

U.S. PATENT DOCUMENTS

| | | | |
|---|---|---|---|
| 2,458,120 | 1/1949 | Volpini | 118/13 |
| 2,808,020 | 10/1957 | Arvidson | 118/13 |
| 2,811,844 | 11/1957 | Selmer | 118/13 |
| 2,814,868 | 12/1957 | Wellinger | 118/13 |
| 2,903,997 | 9/1959 | Hay | 118/23 |
| 2,948,260 | 8/1960 | Lubore | 118/13 |
| 3,669,063 | 6/1972 | Danilake | 118/13 |
| 4,301,762 | 11/1981 | Burnett, Jr. | 118/16 |

*Primary Examiner*—Laura Edwards

[57] ABSTRACT

Corn Buttering Tool is an invention created with the intent of simplifying and efficiently buttering an ear of corn, alleviating slippage and mess. The components consist of a stainless mesh screen which secures and cradles the corn; one butter bin, accommodating up to 1 lb. of butter; and one plastic cover which keeps the butter fresh. The butter is placed into the bin, the mesh is set upon the butter and the heated corn rests on the mesh. Rotating the corn on the mesh attains the desired amount of butter. Combining rotating and sideways motion will allow more butter to be applied to the corn. The design's primary function is to butter corn however it may be used as a butter storage unit. The bin's arched shaped base allows for maximum butter usage. The side lip of same prevents excess melted butter from spilling over.

1 Claim, 4 Drawing Sheets

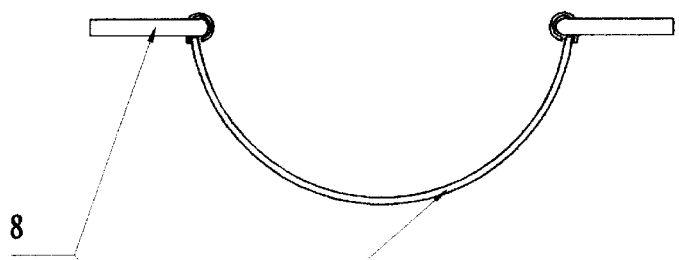
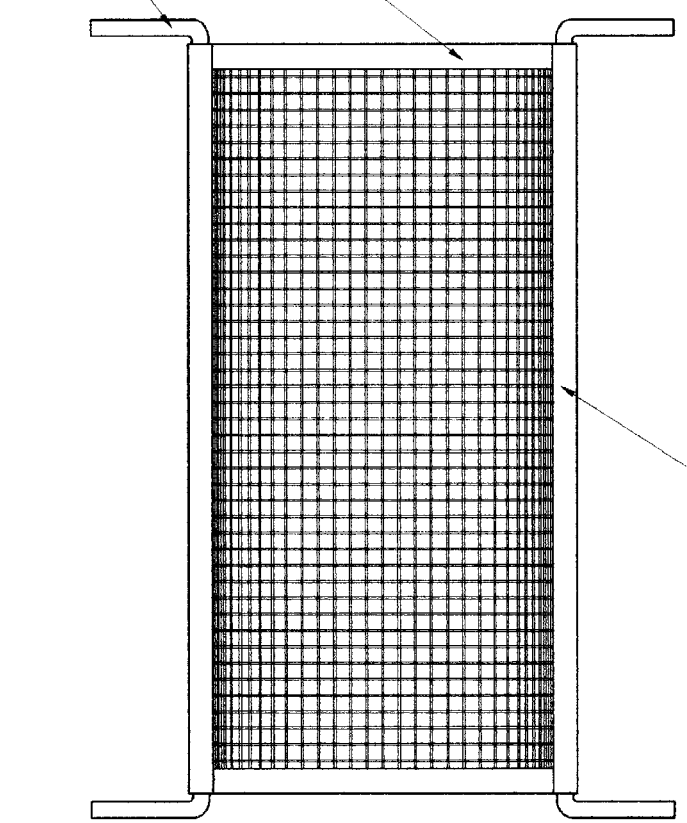
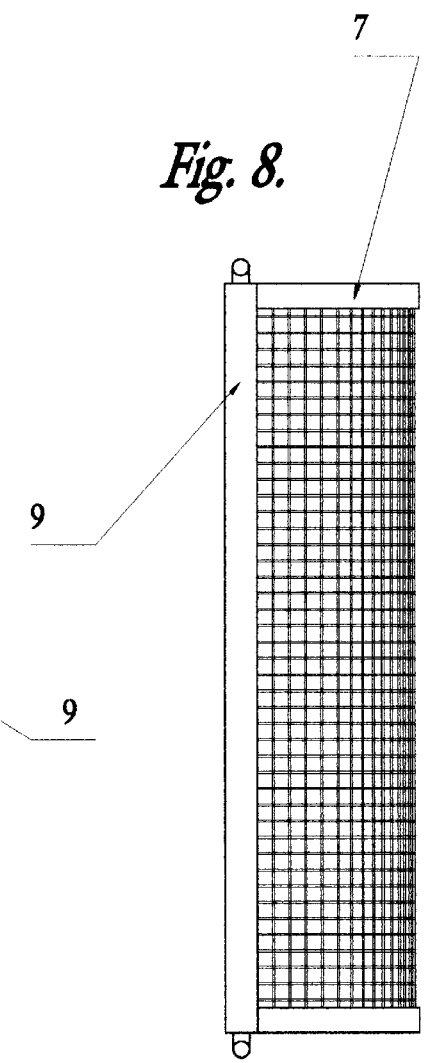

CORN BUTTERING TOOL

CROSS-REFERENCES TO RELATED APPLICATIONS

Not applicable.

STATEMENTS AS TO RIGHT TO INVENTIONS MADE UNDER FEDERALLY SPONSORED RESEARCH AND DEVELOPMENT

Not applicable.

BACKGROUND OF THE INVENTION

This invention relates to a food preparation aid that will alleviate mess and more efficiently apply butter to an ear of corn. Normally when an individual is preparing supper, i.e. getting the corn ready for consumption, there is usually an ordeal in the preparation of it: butter droppings all over the tablecloth, corn slipping onto the floor. Should a pad of butter be placed on an ear of corn, it shifts and ends up either in the dish or, on your clothes. Others have used a slice of American bread, loaded with butter, rolling the corn around and buttering it. Although this can work, there is much butter wasted.

OBJECT OF THE INVENTION

This invention is created with the intent of simplifying the preparation and presentation of corn on the cob. The object of this invention is to efficiently butter an ear of corn, alleviating slippage and mess.

BRIEF DESCRIPTION OF THE DRAWINGS

FIG. 6. is an elevation view of the arched side of the mesh;

FIG. 7. is a plane view thereof, and

FIG. 8. is an elevation view of the elongated side of the said mesh.

DETAILED DESCRIPTION OF THE DRAWINGS

The Corn Buttering Tool components consist of: A strategically designed stainless steel mesh screen 1, which secures and cradles the corn; one butter bin 2, which can comfortably accommodate up to 1 lb. of butter and a plastic cover 7 which keeps butter fresh and free from bacteria.

Figure 1:
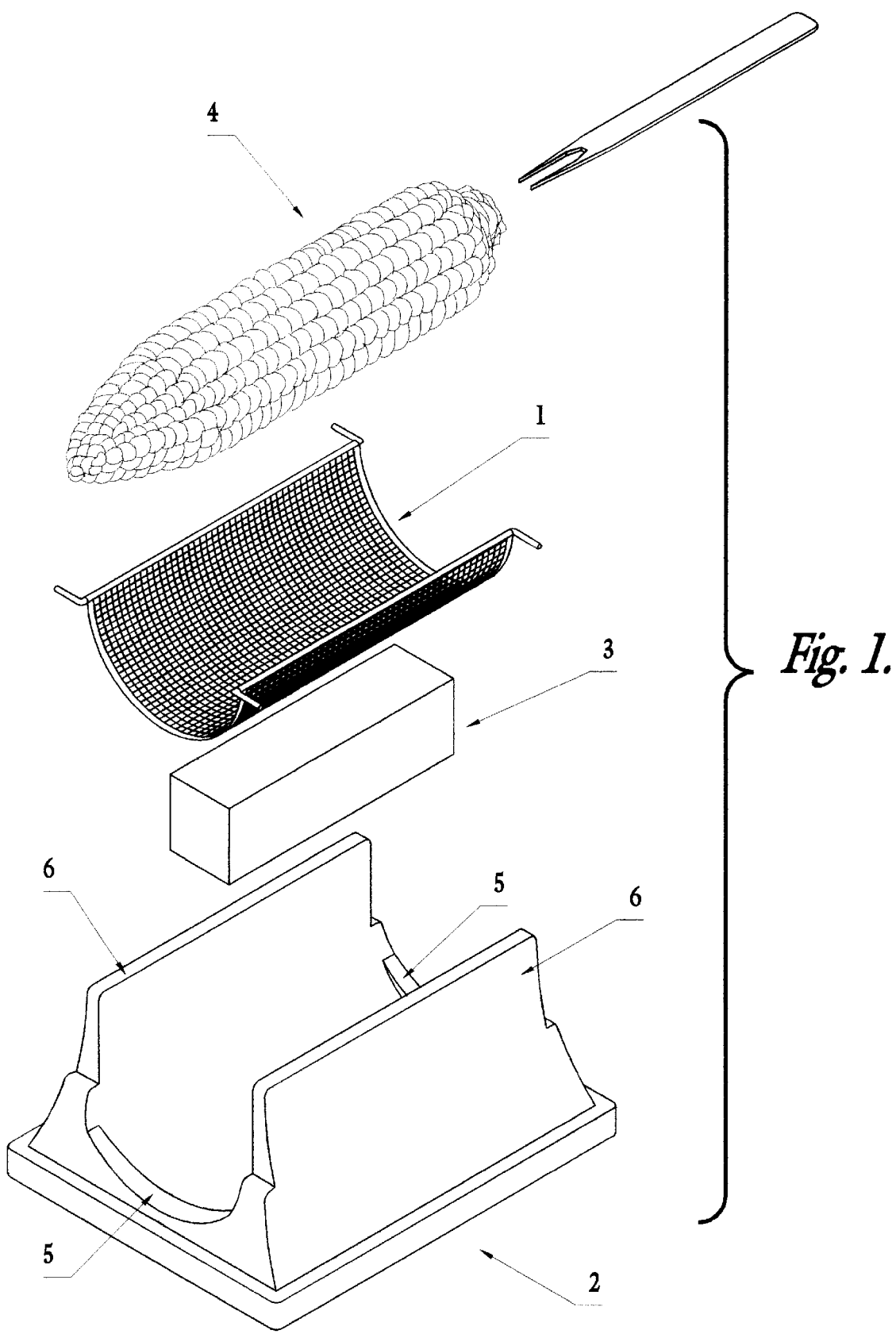
FIG. 1. is a pictorial view, in perspective, of the corn buttering tool presenting the order in which it is to be set for use.
Figure 2:
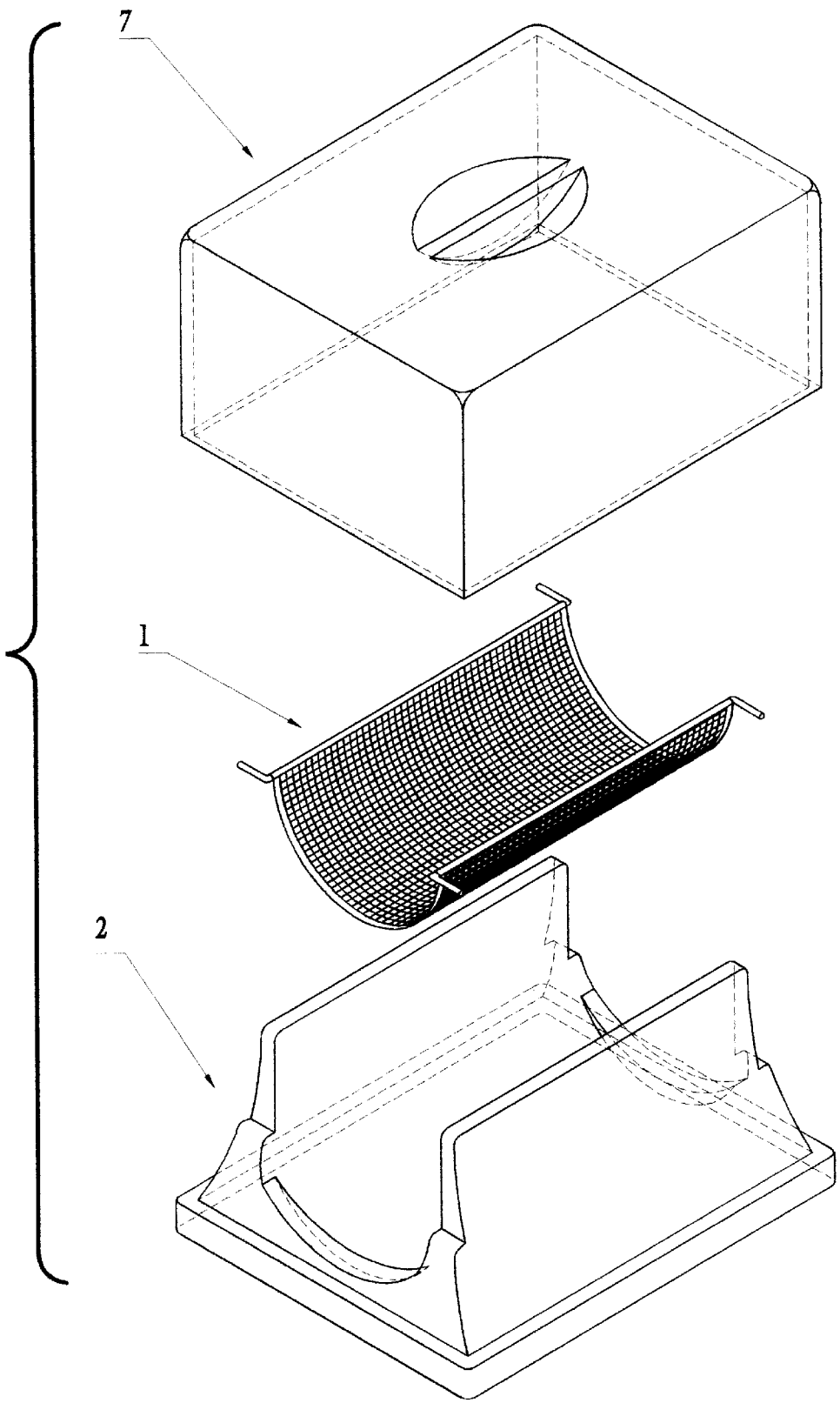
FIG. 2. is a perspective exploded view of the corn buttering tool, including the broken lines presenting the full shape of said.

The suggested design of a skewer as shown in FIG. 1. should be manufactured as a one-piece stainless steel unit. For usage of the Corn Buttering Tool any similar device on the market, including a fork or one's fingers will effectively render the same result. The stainless steel screen mesh is similar in quality and density to those used in other known food preparation strainers. The butter bin 2 is designed so that it may be manufactured in plastic, ceramic, glass or crystal. The transparent cover 7 allows an easy view of contents, is constructed of either durable, lightweight plastic or glass, and possesses an easy-grip handle. Said cover fits securely over the butter bin, resting on the rim of the base of said bin, preserving freshness.

The butter 3 is placed into the bin 2. The stainless steel mesh 1 is placed upon the butter 3. Still warm, previously prepared corn 4, once skewered is placed upon the mesh screen 1. Depending upon an individual's personal preferences, the desired amount of butter is then applied to the ear of corn by rotating it and moving it left to right across the screen mesh. By letting an ear of corn set for a few seconds on the screen, more butter will seep through the mesh, allowing adequate buttering.

Figure 3:
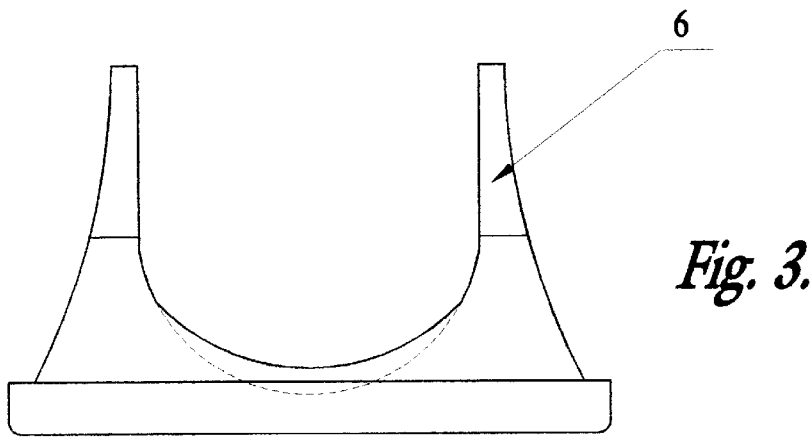
FIG. 3. is a elevation view of the front side of the butter bin.
Figure 4:
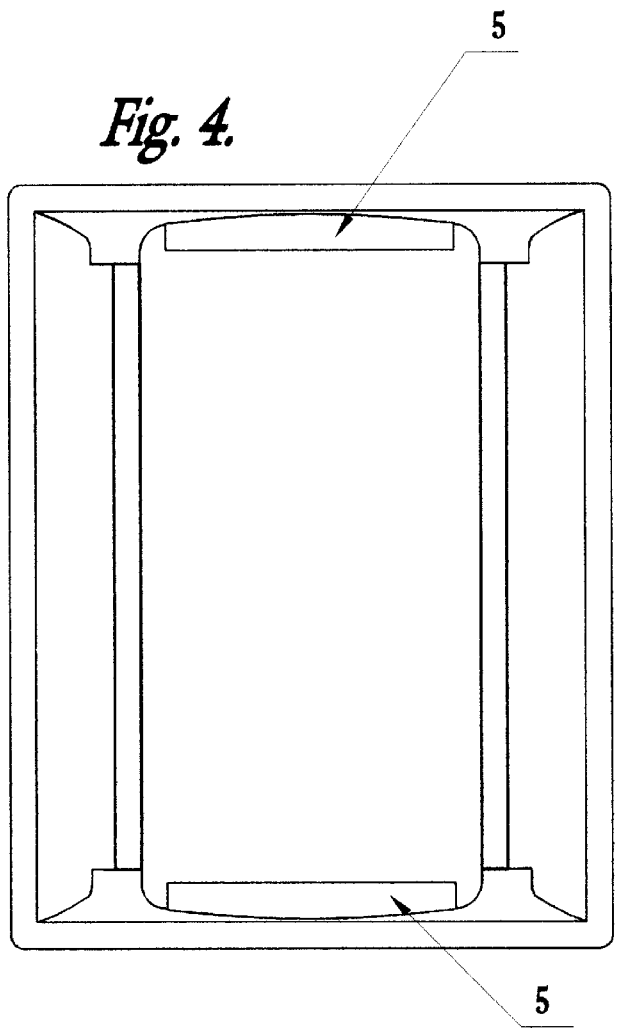
FIG. 4. is a plane view thereof, FIG. 5. is an elevation view of the elongated side of the said bin.
Figure 5:
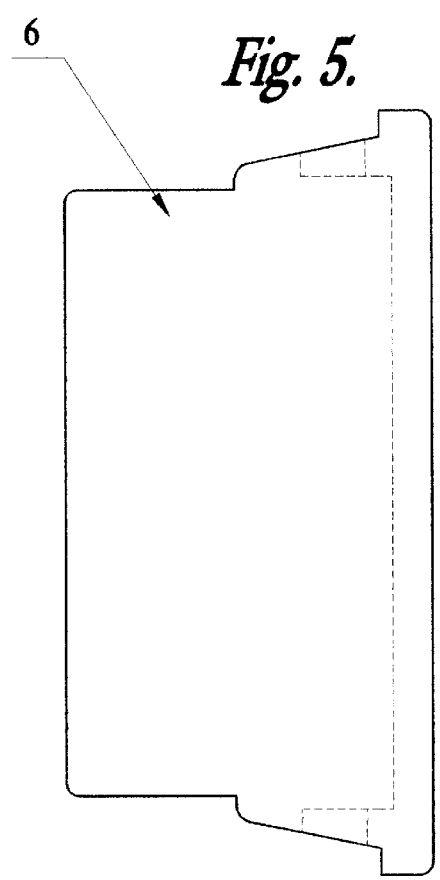

Corn Buttering Tool is designed primarily as a corn buttering aid. However, its simple design may be used simply as a butter storage unit. The bin's interior base is arched shaped (FIG. 3.), allowing for ultimate usage of butter. The short side walls keep excess melted butter in the bin; therefore, retaining minimal melted butter for future usage. The elongated side walls 6 of the butter bin are designed with ample space allowing the mesh screen to sit upon the butter and freely descend into the bin as the butter is used. The stainless steel mesh 1 is shaped to fit flush to the bottom of the butter bin, allowing full usage of butter remaining in said bin. Bordering the arched shaped screen are thin aluminum frames 7, which keep the arched form. The elongated sides of the mesh are wrapped around stainless steel wire 8 held by a thin aluminum grip 9. When the Corn Buttering Tool is used to butter corn, the mesh is placed upon the butter. Placement of heated corn upon the mesh allows the uppermost layer of butter to melt, thus exiting through the mesh onto the corn, without any additional pressure exerted but the weight of the corn. The movement of the corn in any direction will result in the desired amount of butter on the kernels. The stainless steel mesh prevents loose kernels and debris from falling into the butter, leaving the butter intact, unaffected and ready for continued use.

When the meal is completed, lift the mesh, run under warm water or place in a dishwasher and wash accordingly. The remaining butter in the bin is ready for next usage, provided that it is covered with the lid and ordinary usage and care is taken.

I claim as my invention:

1. A device for the application of butter onto an ear of corn and storage of said butter and said ear of corn comprising:

a storage bin for holding at least one stick of butter, said bin comprising a base having side walls extending from said base, at least two of said side walls being of a first height and remaining side walls being of a second height wherein said second height is less than said first height, said base and side walls defining a bin having an arch cross section;

removable mesh screen, seated within said bin contacting said at least one stick of butter, said screen cradling said ear of corn and allowing buttering of said ear of corn through said screen, said screen including an arch shaped portion having handles at ends thereof, said handles being supported by said side walls of said first height; and a removable lid for covering said bin and screen allowing storage of said butter.

* * * * *